United States Patent
Zwicker et al.

(10) Patent No.: US 10,820,745 B2
(45) Date of Patent: *Nov. 3, 2020

(54) BREWING MODULE, A CAPSULE RECOGNITION MODULE AND A DRINKS PREPARATION MACHINE

(71) Applicant: QBO Coffee GmbH, Wallisellen (CH)

(72) Inventors: Dominic Zwicker, Nesslau (CH); Claudio Foscan, Rapperswill-Jona (CH)

(73) Assignee: QBO COFFEE GMBH, Wallisellen (CH)

( * ) Notice: Subject to any disclaimer, the term of this patent is extended or adjusted under 35 U.S.C. 154(b) by 210 days.

This patent is subject to a terminal disclaimer.

(21) Appl. No.: 15/779,276

(22) PCT Filed: Nov. 28, 2016

(86) PCT No.: PCT/EP2016/078987
§ 371 (c)(1),
(2) Date: May 25, 2018

(87) PCT Pub. No.: WO2017/093178
PCT Pub. Date: Jun. 8, 2017

(65) Prior Publication Data
US 2018/0344075 A1    Dec. 6, 2018

(30) Foreign Application Priority Data
Dec. 1, 2015  (EP) ...................................... 15197376

(51) Int. Cl.
*A47J 31/36* (2006.01)
*A47J 31/44* (2006.01)
*G06K 9/32* (2006.01)

(52) U.S. Cl.
CPC ....... *A47J 31/4492* (2013.01); *A47J 31/3623* (2013.01); *A47J 31/3633* (2013.01); *G06K 9/3241* (2013.01)

(58) Field of Classification Search
CPC ................ A47J 31/4492; A47J 31/3633; A47J 31/3623; G06K 9/3241
See application file for complete search history.

(56) References Cited

U.S. PATENT DOCUMENTS 7,673,558 B2 * 3/2010 Panesar ............... A47J 31/0673
99/295
2017/0325626 A1 * 11/2017 Rubin ................. A47J 31/3695

FOREIGN PATENT DOCUMENTS

CN    102789115 A   * 11/2012
EP    1 440 640        7/2004
(Continued)

OTHER PUBLICATIONS

English translation of International Preliminary Report on Patentability dated Jun. 5, 2018 (dated Jun. 5, 2018), Application No. PCT/EP2016/078987, 8 pages.

*Primary Examiner* — Sarang Afzali
*Assistant Examiner* — Ruth G Hidalgo-Hernandez
(74) *Attorney, Agent, or Firm* — Rankin, Hill & Clark LLP (57) ABSTRACT

A capsule-detecting module for a brewing module for preparing a brewed drink from a single-serve capsule, including: an optical sensor, especially a camera, for detecting optical properties of the capsule located in a capsule detection position; a capsule detection window made of a transparent material and arranged between the capsule detection position and the camera; and a module cover that closes an access opening and is designed to be opened and/or removed without using any tools, the side of the capsule detection (Continued)

window facing the capsule detection position being accessible through the access opening when the module cover is open or removed.

10 Claims, 4 Drawing Sheets

(56) References Cited

FOREIGN PATENT DOCUMENTS

| | | |
|---|---|---|
| EP | 3 028 608 | 6/2016 |
| EP | 3 031 748 | 6/2016 |
| EP | 3 031 749 | 6/2016 |
| EP | 3 031 750 | 6/2016 |
| GB | 2 411 105 | 8/2005 |
| WO | 2010/118544 | 10/2010 |
| WO | 2015/004552 | 1/2015 |
| WO | 2015/039258 | 3/2015 |
| WO | 2016/087190 | 6/2016 |

* cited by examiner

BREWING MODULE, A CAPSULE RECOGNITION MODULE AND A DRINKS PREPARATION MACHINE

BACKGROUND OF THE INVENTION

Field of the Invention

The invention relates to extraction appliances for preparing drinks or the like, from an extraction material, for example ground coffee, which is contained in a capsule. In particular, it relates to a brewing module for an extraction appliance, to a capsule recognition module, as well as to a drinks preparation machine with such a brewing module and/or capsule recognition module.

Description of Related Art

Extraction appliances for preparing drinks or the like from an extraction material that is present in a portion package are known, for example, as coffee machines or espresso machines. In many corresponding systems, the portion packages are designed as capsules, in which the extraction material is sealed, for example, in an airtight manner. For extraction, the capsule is pierced, for example at two sides that are opposite to one another. An extraction fluid—generally hot water—is introduced at the first side. The extraction product is discharged from the capsule at the second side. This takes place in a so-called brewing module. Such a module includes a brewing chamber, in which the capsule is received. Brewing modules, with which the capsule is inserted and the brewing chamber is closed manually by way of an operating lever or automatically in a motorised manner are particularly popular, wherein the capsule is automatically removed from the brewing chamber and ejected into a capsule container after the brewing procedure on renewed opening of the brewing chamber. Such brewing modules with an automatic capsule ejection are generally designed as horizontal brewing modules, i.e. the insertion of the capsule is effected from above, the closure of the brewing chamber is a horizontal relative movement of two brewing chamber parts, the brewing fluid flows essentially horizontally and the capsule container is formed below the brewing chamber.

A problem area in this context concerns the detection of capsule characteristics, for example the reading-out of information attached to the capsule, for activating a brewing process in dependence on this information. One possibility as far as this is concerned, is to provide the capsule with a suitable marking or colour combination and to optically detect this. This is effected, for example, with a camera. However, practical problems arise with such a process, which is carried out in the direct proximity of the brewing chamber. Due to the heat dissipated by the brewing chamber and due to the water vapour and contamination, on the one hand it is desirable to attach a camera as remotely as possible from the brewing chamber and in a manner shielded from this. On the other hand, corresponding shieldings—in the form of windows for example—can render the read-out process itself more difficult, in particular if they become fogged or dirty. The usual measures combating such fogging or contamination are coatings, which however are only effective to a limited extent in the environment of the brewing chamber.

GP 2 411 105 and WO 2015/004552 each disclose a coffee machine for preparing coffee from a portion capsule, with which a graphic element which is attached on the capsule is optically detected through a window. Such a window can however easily become fogged or contaminated and should be easy to clean.

SUMMARY OF THE INVENTION

It is an object of the invention to provide a drinks preparation machine that overcomes disadvantages of the state of the art and which, on account of an as simple as possible design, permits the detection of characteristics of an applied portion capsule before the brewing process.

According to the invention, a capsule recognition module for a brewing module for preparing a brewed drink from a portion capsule is provided, and it includes:
  an optical sensor, in particular a camera, for detecting optical characteristics of the capsule, which is located at a capsule recognition position,
  a capsule recognition window of a transparent material between the capsule recognition position and the optical sensor, and
  a module cover that closes an access opening and is configured to be reversibly opened and/or removed, in particular in a tool-free manner, wherein given an opened or removed module cover, the side of the capsule recognition window towards the capsule recognition position is accessible through the access opening.

The module cover can be reversibly opened or removed, by way of it not being fixedly/materially connected to the remaining parts (for example to a module housing). In contrast, an opening/removal in a destruction-free manner is possible and the module cover can also again be brought into its defined initial position, which closes the access opening. In particular, the module cover can be present as a part that is separate from the module housing and which in embodiments is pivotably connected to this housing via a pin or the like, which functions as a pivoting axis.

A snapping-in or clicking-in of the cover in the closing position can also be envisaged in embodiments. The opening/removal and closing of the cover is possible by way of the average user in a tool-free manner, i.e. by way of his fingers, wherein the (prescribed or advantageous) application of tools is not ruled out.

Here, a "window" is to be understood as a through-opening that is at least partly closed by the transparent material, in particular in disc-form, so that the axis crosses the transparent material (the disc). In most cases, the transparent material is designed as a disc with planar-parallel surfaces, by which means the window has no influence upon the optical imaging characteristics. However, one should not rule out also providing the window for example with a lens function, so that it acts, for example, in a collimating manner or influences the imaging characteristics in a another manner, such that it must also be taken into account of computing the camera imaging characteristics. In cases, in which the transparent window material does not form a planar-parallel disc, statements with regard to the position of the window relate to the middle plane of the transparent window material.

The module cover is generally different from a possible cover (slide, pivotable lever or the like), which closes the capsule insert opening of the drinks preparation machine. Apart from the mentioned access opening which is closed by the module cover, the capsule recognition module also includes a separate access, in particular the mentioned capsule insert opening, to the capsule recognition position, so that the module cover can remain closed in normal operation.

On account of the access opening being separate from the capsule insert opening, the module can be designed such that the capsule recognition window is also accessible when a capsule is located at the capsule recognition position. This can be advantageous, for example, when a user has already inserted the capsule, but a capsule recognition is not successful since the capsule recognition window is fogged or contaminated. The user then merely needs to open the module cover, in order to wipe off the capsule recognition window, and does not need to remove the capsule for this.

In particular, the module cover is arranged between the capsule insert opening and an axial position of the capsule recognition window, so that a region between the capsule recognition position and the capsule recognition window is rendered accessible through the access opening. The fact that the window is of a "transparent" material does not mean that it needs to be completely transparent to the complete visible range of the electromagnetic spectrum. In contrast, it is only a transparency to a part of the electromagnetic spectrum, to which the optical sensor is sensitive, which is demanded, for which the capsule includes an optically readable feature. Thereby, it is particularly light in the visible wavelength region or infrared light region which is considered.

In embodiments, the capsule recognition window is arranged at a non-right angle to an axis between the capsule recognition position and the optical sensor.

Here, the axis between the capsule recognition position and the optical sensor is to be understood as an axis in the optical sense, i.e. in the case of light-deflecting means between the capsule recognition position and the sensor, the axis does not necessarily correspond to a direct connection but to a beam path of a light beam, said light beam going along the shortest path from the middle of a surface of the capsule at the capsule recognition position, said surface being detected by the camera, to the middle of the sensor. If the optical sensor is a camera with camera optics, then the axis can coincide with an optical axis (axis of symmetry) of the camera optics.

By way of the simple measure of a "non-right angle", one can prevent reflections of light which are beamed in from the direction of the optical sensor from acting upon the optical sensor or such reflections can at least be reduced.

This can be of relevance for example if, according to embodiments, at least one light source is arranged after the capsule recognition window with regard to the capsule recognition position. Such an arrangement of a light source can have a practical advantage, since the light source is then likewise protected by the capsule recognition window and can moreover be easily integrated with the camera, for example by way of it being arranged on the same circuit board as the camera sensor. In embodiments, a plurality of LED light sources can be present, for example arranged around the optical sensor.

Due to the avoidance of reflections, the optical sensor can be set in a very sensitive manner since no disturbing influences of such reflections are present.

The angle of the perpendicular to the capsule recognition window to the axis at the location of its passage through the window is for example at least 10°, in particular at least 15° or at least 20°, and for example maximally 55° or 45° or 40°.

In particular, the capsule recognition window can be inclined towards the side of the module cover, i.e. the normal to the capsule recognition window towards the side of the capsule recognition position points away from the axis and has a component in the direction of the module cover. On account of this, given an opened or removed module cover, the user can look upon this side of the capsule recognition window, immediately sees a possible contamination or a fogging and if required can also clean the capsule recognition window.

The window however is generally not parallel to the module cover, but is at a non-right angle to this. In particular, the module cover can run roughly parallel to the axis in the closed position (i.e. for example, a plane or translation axis which are defined by the module cover run roughly parallel to the axis).

In embodiments, the mentioned axis runs roughly horizontally between the capsule recognition position and the optical sensor, and the cover terminates an optical region, in which the light gets from the capsule recognition position to the optical sensor (and through which, for example, light is beamed onto the capsule in embodiments with a light source), to the top or to a side.

In particular, the module cover can be pivotable, i.e. it is fastened on the housing (of the capsule recognition module or of the brewing module/of the drinks preparation machine) at a pivot axis and is to be opened by way of a pivoting movement. For example, it can possibly be arranged below an operating lever or other operating element (slide or the like) of the drinks preparation machine, below which element the capsule insert opening is also located, so that an opening of the module cover requires an opening of the operating element.

The function of the module cover in its closed condition, apart from a mechanical protection of the capsule recognition window, can also be an optical shielding of the optical region from ambient light. The module cover can be manufactured from a non-transparent material for this purpose.

In particular, given a closed module cover, one can envisage an inside of the capsule recognition module and consequently of the brewing module, to which the capsule recognition module belongs, only being open towards the necessary capsule insert opening in the condition installed into the drinks preparation machine. Herein, the capsule insert opening is generally closable in a manner known per se, for example by way of an operating lever, a slide or the like.

In embodiments, the capsule recognition module further includes a fan for producing an airflow at the side of the capsule recognition window which is towards the capsule recognition position. A "fan" here is to be understood as an active fan, i.e. a fan, with which air is moved by way of an active input of energy, in particular an electrically driven fan. In particular, the fan can be designed as a ventilator which transports air between the region in front of the capsule recognition window and an environment of the drinks preparation machine. A fogging of the capsule recognition window can be efficiently prevented by way of such a fan.

With the drinks recognition module, in particular one can firstly determine whether the inserted capsule is suitable for use in the drinks preparation machine in the first place, or not—and this is known per se. Secondly, there exists the possibility of outputting corresponding information to the user, for example via a display, on the basis of the recognised capsule characteristics. For example, the drink type (coffee, tea, etc.), the sort (e.g. "100% Arabica"), the recommended preparation manner (e.g. "espresso", "ristretto" or "lungo" etc.) and/or other information can be displayed. Thirdly, the program that is implemented by the coffee machine for the brewing can be selected on the basis of the recognised capsule sort; for example the brewing pressure, the brewing duration as well as possibly also the temperature and/or other characteristics can be set depending on whether the inserted capsule is envisaged for the preparation of e.g. ristretto, espresso or lungo.

Suitable, optically readable features are, for example, a bar code, a 2D matrix code (for example QR code or Aztec code), a pictogram (icon) and/or a certain colouring. A code according to the European patent applications 14 197 487.3, 14 197 488.1 and/or 14 197 489.9 can also be considered.

The capsule recognition module moreover includes, for example, at least one light source for illuminating the capsule at the capsule recognition position. Such a light source is preferably arranged behind the capsule recognition window, i.e. the side of the capsule recognition window that is towards the optical sensor, in order, as also the case with the optical sensor, for it to be protected from vapours and contamination by way of the capsule recognition window.

Such a light source can e.g. include an LED or a number of LEDs.

A light diffuser can be present between the light source and the capsule recognition position, for example likewise behind the window, in order to prevent any occurring reflections at the capsule, particularly in cases, in which the capsule surface acts in a slightly reflecting manner.

A light source and a diffuser in particular can be arranged peripherally with respect to the optical sensor and a possible optical axis. The diffuser for example can surround the camera optics.

In embodiments with an oblique capsule recognition window, reflections of the light source at the window are not visible from the location of the optical sensor. The optical sensor can therefore be set very sensitively, since no interfering influences of such reflections are present.

The capsule recognition module can be used as part of a brewing module or be assigned to such.

The invention also relates to a drinks preparation machine with a capsule recognition module of the described type.

In particular, one can envisage the drinks preparation machine including a horizontal brewing module of the initially described type. The capsule recognition module can be arranged above that position (brewing position), in which in the brewing chamber is located in the closed condition of the brewing module. The capsule recognition position is then vertically above the brewing portion. The mentioned axis between the capsule recognition position and the optical sensor can run roughly horizontally and the access opening can be an opening from the top or from the side.

The capsule insert opening of the machine can permit an insertion of the capsule into the capsule recognition position in a direct manner, i.e. the capsule insert opening can be formed by the capsule recognition module. In alternative embodiments, an outer capsule insert opening can be formed in a machine housing and an inner capsule insert opening on the capsule recognition module.

As already mentioned, the drinks preparation machine can include an operating element (lever, slide or the like), with which the capsule insert opening can be closed. In particular, one can envisage such an operating element of the machine also closing the module cover in the closed condition.

BRIEF DESCRIPTION OF THE DRAWINGS

Embodiment examples of the invention are hereinafter described by way of the figures. In the figures, the same reference numerals describe the same or analogous elements. There are shown in.

DETAILED DESCRIPTION OF THE INVENTION

Figure 1:
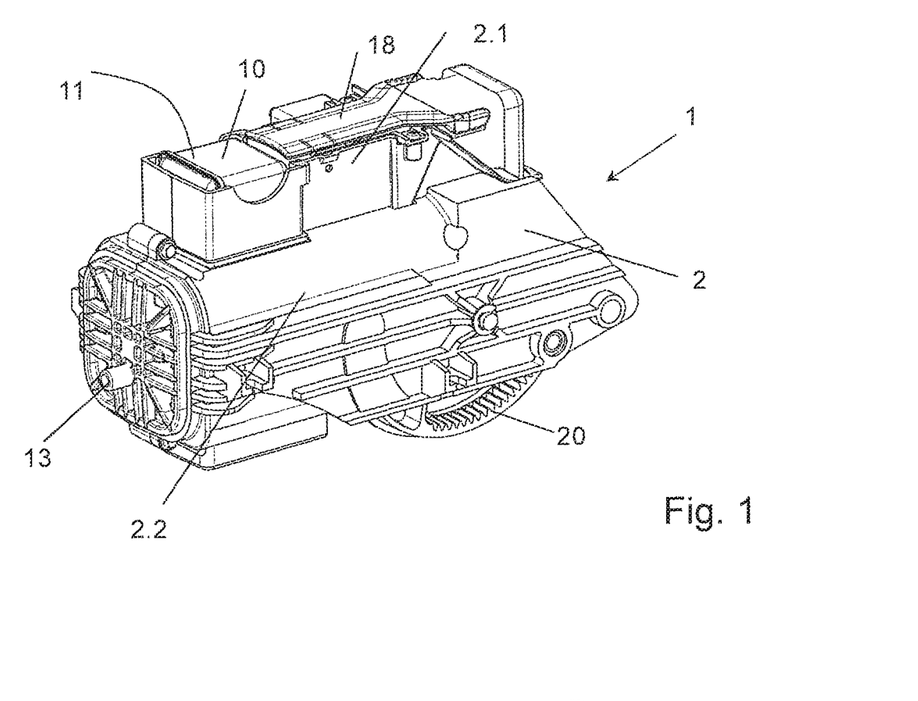
FIG. 1 a view of a brewing module with a capsule recognition module.

The brewing module 1 according to FIG. 1 includes an outer brewing module housing 2. In the represented embodiment example, this is composed of an upper housing part 2.1 (capsule recognition housing) and of a lower housing part 2.2 (brewing chamber unit housing). A capsule insert opening 11, through which a portion capsule 10 can be inserted into the brewing module, is formed at the upper side.

Figure 2:
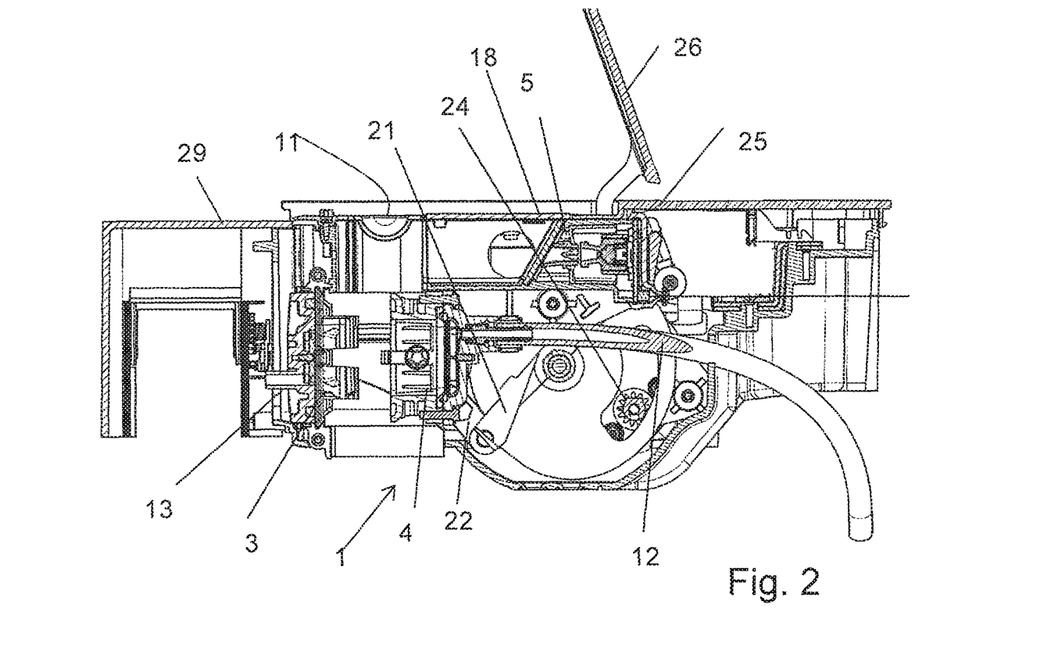
FIG. 2 a sectioned representation of the brewing module with the capsule recognition module of FIG. 1, installed into a coffee machine.

FIG. 2 in a longitudinal section shows a part of a coffee machine with the brewing module. The brewing module 1 is installed into an outer machine housing 25 with a pivotable operating lever 26 which in the closed condition covers the capsule insert opening 11. The housing also forms a run-out hood 29 at a front side.

Two brewing module parts, which are movable relative to one another, specifically a discharge device 3 and an injector 4, are guided in the brewing module housing 2.

The injector 4 includes perforation elements for piercing a capsule, which is able to be introduced into the brewing module via an insert opening 11 and which is at least partly filled with extraction material, for example ground coffee. The injector 4 is designed to introduce a fluid—for example hot water—through the perforation elements or past these, into the pierced capsule, wherein the water can be fed via a water feed 12 which for example can include flexible tubing.

With the embodiment example described here, the discharge device 3 also includes perforation elements, specifically extraction-side piercing spikes. These can be designed, for example, as is described in WO 2015/039258 or in WO 2010/118544 or have another design, and the application of principles other than piercing tips, for example with grating-like structures are also possible.

As is known per se for preparing a brewed drink, a capsule is placed between the discharge device 3 and the injector 4, and these are moved towards one another such that a brewing chamber encompassing the capsule is formed between these. The hot water is fed under pressure through the injector to the capsule, and the extraction product flows through the discharge device 3 via a drinks outlet 13 into a drinks vessel that is placed therebelow, for example.

The relative movement of the brewing module parts—the discharge device and the injector—in the embodiment example described here is achieved by way of the discharge device 3 being assembled in a manner in which it is fixed to the housing, whereas the injector 4 is movable along the horizontal axis. The drive of the injector is effected via a toggle lever driven in a motorised manner via a pinion shaft 24 and a toothed drive disc 20, the toggle lever being connected to/including a first toggle lever arm 21 and a second toggle lever arm 22.

The brewing module, above the brewing chamber unit with the discharge device 3 and the injector 4, includes a capsule recognition unit 5 with a camera. A capsule, which is inserted through the capsule insert opening 11, firstly gets to a capsule recognition position, in the capsule recognition module, where—under certain circumstances depending on the operating condition—optical characteristics of the capsule are read out. The capsule is subsequently transferred downwards into the brewing position. A mechanism which is suitable for this is described in PCT/EP2015/076812, which is expressly referred to here. Other mechanisms, also with a further transport which is to be effected manually or the possibility of the capsule recognition position corresponding to the brewing position are not ruled out.

Figures 3, 4:
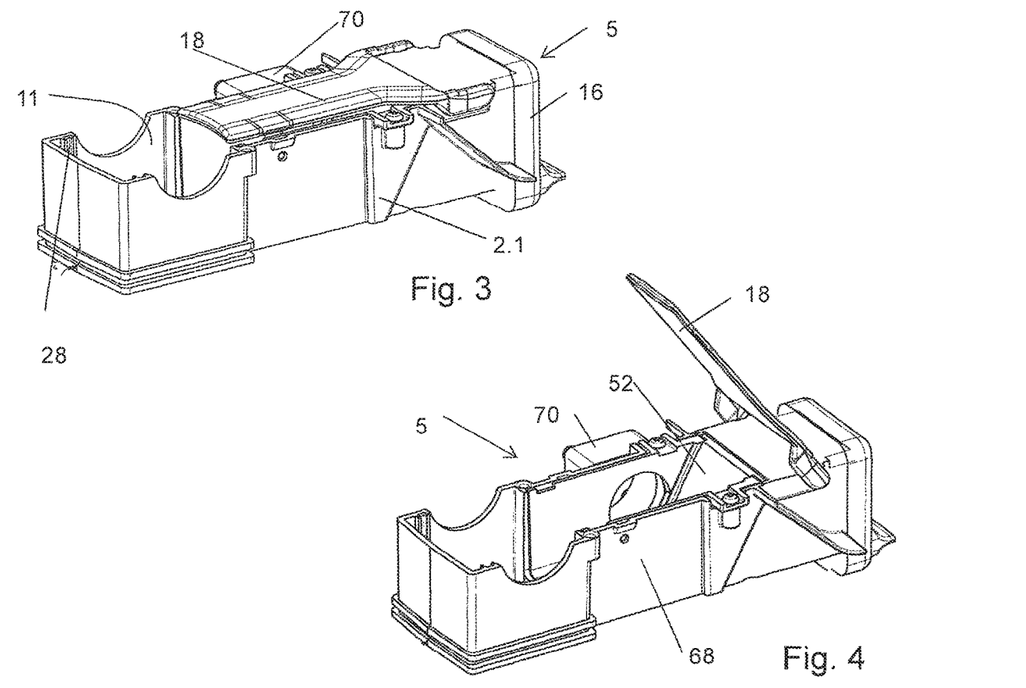
FIGS. 3 and 4 in each case, a view of the capsule recognition module according to FIGS. 1 and 2 with a closed and an open module cover.
Figure 5:
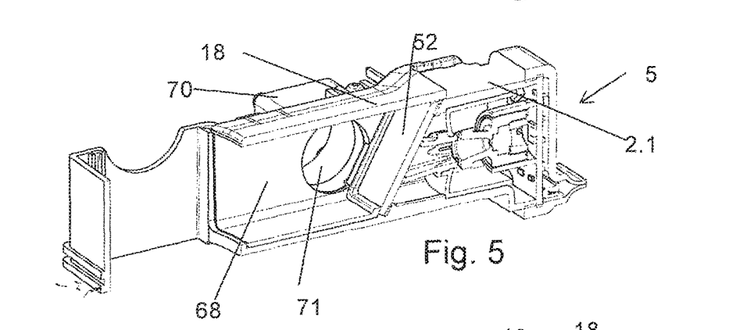
FIGS. 5 and 6 in each case, a sectioned representation of the capsule recognition module.
Figure 6:
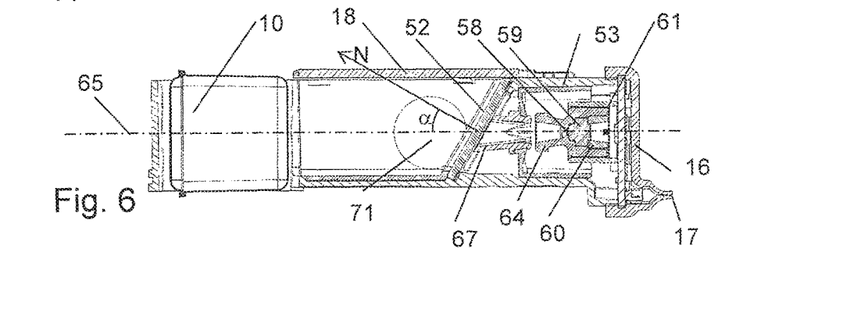
Figure 7:
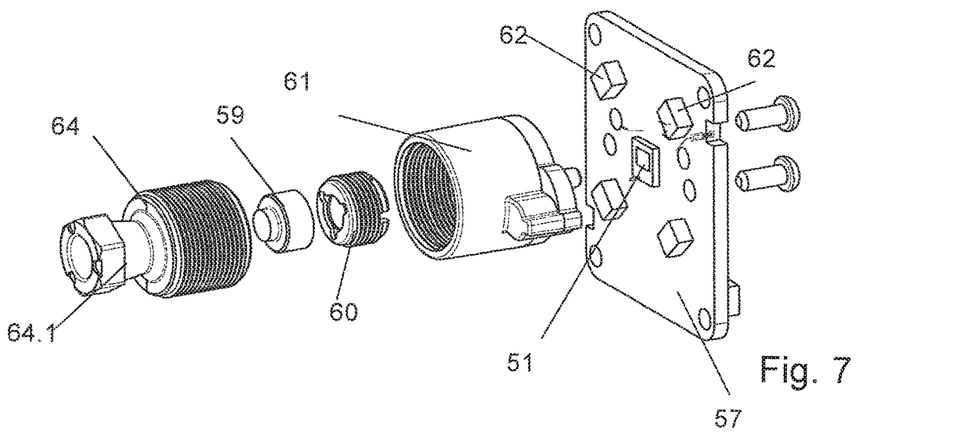
FIG. 7 an exploded representation of a camera unit of the capsule recognition module.
Figure 8:
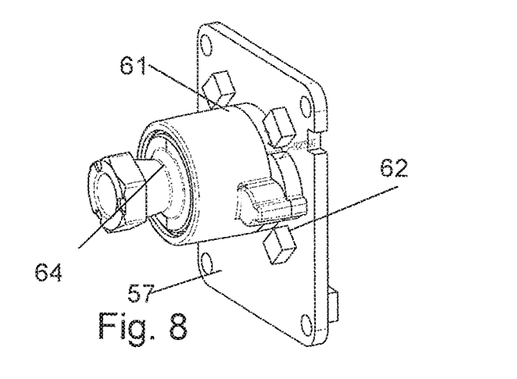
FIG. 8 the camera unit in the assembled condition.
Figure 9:
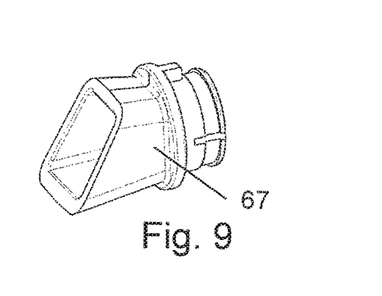
FIG. 9 a second baffle of the capsule recognition module.
Figure 10:
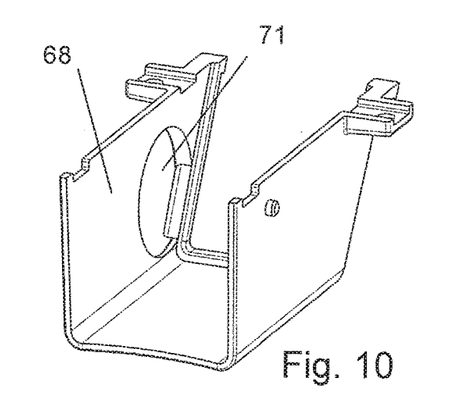
FIG. 10 a reflector of the capsule recognition module.
Figure 11:
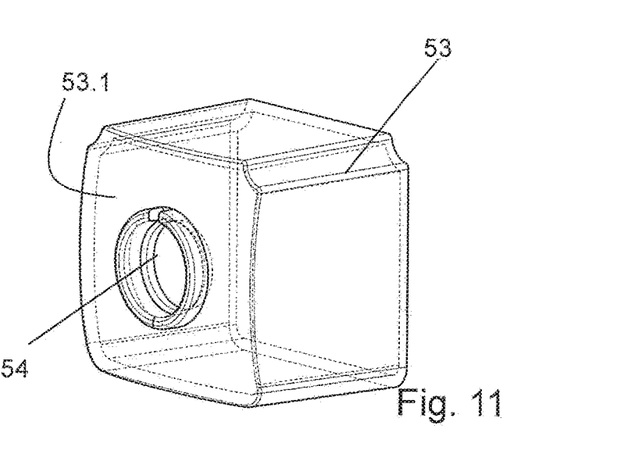
FIG. 11 a diffuser of the capsule recognition module.

FIG. 3 shows the capsule recognition module including the upper housing part 2.1, and FIG. 4 shows a corresponding view with an open module cover 18. FIG. 5 shows a view of the capsule recognition module which is represented in a sectioned manner, with upper housing part, and FIG. 6 shows a corresponding sectioned representation with a capsule 10. FIG. 7 shows an exploded representation of the camera unit, FIG. 8 shows the camera unit in the assembled condition, and FIGS. 9-11 show further elements of the capsule recognition module.

For service purposes, the camera is accessible through a silicone covering 16 which is at the rear and which forms a part of the upper housing part 2.1. This covering forms a sealing lip 17, through which a ribbon cable can be sealingly led; and a data exchange with a central machine control and evaluation electronics takes place via such a ribbon cable, as also the supply of electricity to the camera and light sources.

The camera includes a camera sensor 51, for example with a CCD sensor array or CMOS sensor array, which is arranged on a circuit board 57. Several LEDs 62 as light sources are also arranged on the circuit board 57 at the bottom, wherein these produce light given a capsule recognition procedure, the light via a diffuser 53 (FIG. 11, cf. also FIG. 6) with a structured and thus diffusely acting face surface 53.1 and via a capsule recognition window 52 being cast onto the capsule. A part of the capsule recognition module housing is optionally designed as a reflector 68 with a specifically structured and reflecting surface on its inner side, said surface contributing to the uniform distribution of light from the LEDs 62 on the capsule surface. An opening 71 for the fan is also formed on the reflector 68.

A suitable, optically readable feature, for example a bar code, a 2D matrix code (for example QR code or Aztec code), a pictogram (icon), a code according to one or more of the European patent applications 14 197 487.3, 14 197 488.1 and/or 14 197 489.9 and/or also a certain colouring, are present on the capsule.

The side of the capsule, which is illuminated by the light sources, is detected by the camera and is evaluated in the camera or by way of a separate module (not represented), which, for example, is likewise present in the coffee machine.

The light, which is reflected from the illuminated capsule for this purpose, gets through the capsule recognition window 52, and a diffuser window 54 in the diffuser 53 to the camera which includes an aperture 58, at least one lens 59 as well as the camera sensor 51.

Figure 12:
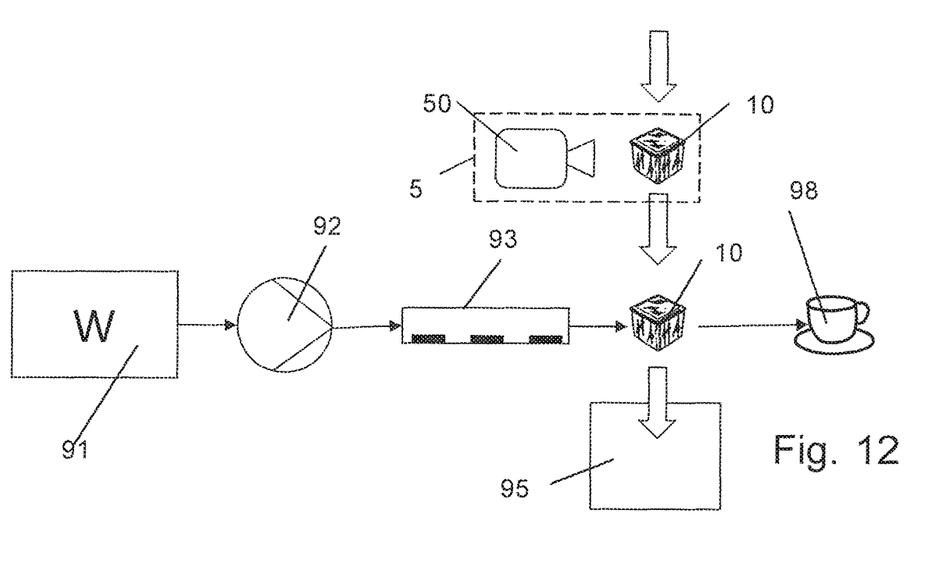
FIG. 12 a schematic diagram of the drinks preparation machine.

Here, the lens 59 is held by a lens holder 64 and is fixed (FIG. 12) by a lens fixations 60 (FIG. 12). The inner lens holder 64 is screwed into an outer lens holder 61, wherein the outer lens holder 61 is assembled on the circuit board 57. The inner lens holder 64 is rotatably arranged in the inside of the lens holder for focussing purposes, wherein a rotation effects a relative displacement on account of the screw connection between the outer and the inner lens holder. The inner lens holder 64 also forms an aperture 58 as well as a first baffle (lens hood, scatter light aperture) 64.1, which prevents light which is scattered back at the diffuser, for example, from getting into the camera optics. A second baffle 67 with an analogous purpose is stuck onto the diffuser 33.

The mechanical details of the camera optics and the design of the diffuser, however, can also be selected differently without further ado.

After the brewing procedure, water vapour also gets into the region above the brewing position and into the environment of the capsule recognition position. The capsule recognition module, apart from the camera unit, therefore also includes the mentioned capsule recognition window 52, which separates the camera and possibly other optical or electronic components from the region, into which water vapour can get.

With regard to the capsule recognition position, a fan 70 is located in front of the capsule recognition window 52 and during the capsule recognition procedure and/or before this produces an airflow in front of the capsule recognition window, by way of it sucking air from outside the coffee machine and blowing it through an opening 71 in the housing—here in the reflector 68—to in front of the capsule recognition window 52.

A feature of the capsule recognition window is that the capsule recognition window 52 is arranged at a non-right angle to the axis 65 (FIG. 6) between the capsule recognition position and the camera sensor 51. By way of this, reflections of the light sources are efficiently prevented from being able to superimpose on the image of the capsule on the camera sensor and from being able to adulterate the evaluation. The angle α of the capsule recognition window plane to the perpendicular to the axis 65 between the capsule recognition position and the camera sensor (defined as the axis going in each case through the middle of the camera sensor surface or the capsule which is located at the capsule recognition position, see FIG. 6; the axis 65 can coincide with the optical axis of the camera) is, for example, at least 10°, in particular at least 15°, and for example maximally 55° or 45°, in the represented example approx. 30°

A pivotable module cover 18 is arranged at the upper side. Given an opened operating lever 26, the module cover 18 can be opened to the top by way of a pivoting movement and thus permits the access to the capsule recognition window. The orientation of the capsule recognition window is herein selected such that the capsule recognition window is inclined towards the side of the module cover 18, i.e. the normal N to the capsule recognition window points away from the axis 65 and has a component in the direction of the module cover. The capsule recognition window 52 becomes easily accessible at the brewing chamber side on account of this, and can be rapidly and efficiently cleaned in the case of fogging or contamination.

A machine according to the invention, for preparing a brewed drink from a portion capsule, here specifically a coffee machine, with a brewing module, is represented schematically in FIG. 12. Apart from the brewing module, it includes a water tank 91, a pump 92 for feeding brewing water to the injector 4 and a water heating device 93 (for example continuous heater). The capsule recognition module 5 with the camera 50 in particular is located above the brewing chamber. After the capsule recognition process, an inserted capsule can be transported further, downwards by way of the effect of gravity, as has been described above. This however is not a necessity.

Moreover, a capsule container 95, into which the capsules 1 drop or are transported during the brewing process is arranged below the brewing module. The reference numeral 98 indicates a coffee cup.

LIST OF REFERENCE NUMERALS 1 brewing module
2 housing
3 discharge device
4 injector
5 capsule recognition module
10 capsule
10' second capsule
11 insert opening
12 water feed
13 drinks outlet
16 silicone covering
17 sealing lip
18 module cover
20 drive disc
21 first toggle lever arm
22 second toggle lever arm
24 pinion shaft
25 outer machine housing
26 operating lever
28 lateral guide
29 run-out hood
50 camera
51 camera sensor
52 capsule recognition window
53 diffuser
54 diffuser opening
57 circuit board
58 aperture
59 lens
60 lens fixation
61 outer lens holder
62 LED
64 inner lens holder
64.1 first baffle
65 axis
67 second baffle
68 reflector
70 fan
71 opening
91 water tank
92 pump
93 water heater device
95 capsule container
98 coffee cup

The invention claimed is:

1. A capsule recognition module for a brewing module for preparing a brewed drink from a portion capsule, comprising a capsule insert opening through which a capsule can be inserted into a capsule recognition position, and further comprising:

an optical sensor for detecting optical characteristics of the capsule when the capsule is located at the capsule recognition position, a capsule recognition window of a transparent material between the capsule recognition position and the optical sensor, a module cover that closes an access opening and is configured to be reversibly opened and/or removed, wherein, when the module cover is opened or removed, a side of the capsule recognition window facing the capsule recognition position is accessible through the access opening, wherein the access opening is separate from the capsule insert opening, and wherein the capsule recognition window is arranged at a non-right angle to an axis between the capsule recognition position and the optical sensor.

2. The capsule recognition module according to claim 1, comprising at least one light source for illuminating the capsule at the capsule recognition position, wherein the light source is arranged on the side of the capsule recognition window that is towards the optical sensor.

3. The capsule recognition module according to claim 2, comprising a diffuser for light that is produced by the light source.

4. The capsule recognition module according to claim 1, wherein an angle between a perpendicular to the capsule recognition window on the one hand and the axis at a location of a passage of the axis through the capsule recognition window on the other hand is between 100° and 45°.

5. The capsule recognition module according to claim 1, wherein the capsule recognition window is inclined towards a side of the module cover.

6. The capsule recognition module according to claim 1, comprising a fan for producing an airflow at the side of the capsule recognition window that is towards the capsule recognition position.

7. The capsule recognition module according to claim 1, wherein the module cover is fastened on a module housing at a pivot axis and can be opened by way of a pivoting movement.

8. A drinks preparation machine, in particular coffee machine, comprising a water feed, a pump and a water heater as well as the capsule recognition module according to claim 1.

9. The drinks preparation machine according to claim 8, wherein the access opening is closable by the module cover when the capsule insert opening is accessible.

10. The drinks preparation machine according to claim 8, comprising an operating element for closing the capsule insert opening, wherein the module cover is covered by the operating element when this closes the capsule insert opening.

* * * * *